United States Patent [19]

Bryan et al.

[11] Patent Number: 5,638,606

[45] Date of Patent: Jun. 17, 1997

[54] SPIDER AND LIFTER ASSEMBLY FOR CENTRIFUGAL PELLET DRYER

[75] Inventors: David E. Bryan, Buchanan; Robert K. Crowder; Samuel F. Hannah, both of Eagle Rock, all of Va.

[73] Assignee: Gala Industries, Inc., Eagle Rock, Va.

[21] Appl. No.: 611,403

[22] Filed: Mar. 6, 1996

[51] Int. Cl.$^6$ ..................................................... F26B 17/24
[52] U.S. Cl. ................................ 34/59; 34/147; 34/166; 34/173; 34/182; 34/183
[58] Field of Search ........................... 34/58, 59, 142, 34/147, 166, 173, 179, 182, 183; 416/210 R, 214 R, 216, 233 R, 131, 244 R

[56] References Cited

U.S. PATENT DOCUMENTS

| | | |
|---|---|---|
| 2,778,123 | 1/1957 | Kurtz ........................................... 34/173 |
| 3,458,045 | 7/1969 | Dudley ........................................ 210/95 |
| 4,218,323 | 8/1980 | McCracken ................................ 210/415 |
| 4,565,015 | 1/1986 | Hundley, III ............................... 34/182 |
| 4,896,435 | 1/1990 | Spangler, Jr. ................................ 34/58 |
| 5,197,205 | 3/1993 | Spada et al. ................................ 34/182 |
| 5,246,343 | 9/1993 | Windsor et al. ....................... 416/210 R |
| 5,265,347 | 11/1993 | Woodson et al. ............................ 34/58 |

Primary Examiner—John M. Sollecito
Assistant Examiner—Steve Gravini
Attorney, Agent, or Firm—Jacobson, Price, Holman & Stern, PLLC

[57] ABSTRACT

Improvements in centrifugal pellet dryers and more particularly to improvements in the rotor structure which includes a shaft, pellet lifter assemblies and supporting spiders which support the pellet lifter assemblies from the shaft. Each spider is made of a one-piece plate laser cut for strength, balance and simplicity. Mounting of the pellet lifter assemblies on the spider, and the spider on the shaft, are configured for easy assembly and maintenance.

14 Claims, 2 Drawing Sheets

५,६३८,६०६

SPIDER AND LIFTER ASSEMBLY FOR CENTRIFUGAL PELLET DRYER

BACKGROUND OF THE INVENTION

1. Field of the Invention

The present invention generally relates to improvements in centrifugal pellet dryers and more particularly to improvements in the rotor structure which includes the shaft, pellet lifter assemblies and supporting spiders which support the pellet lifter assemblies on the shaft.

2. Description of the Prior Art

Plastic pellets are typically formed in an underwater pelletizer in which molten polymer is extruded through orifices in a die plate and cut into pellets by a rotating knife assembly, all of which is located under water with the pellets and water being discharged from the under water pelletizer as a slurry. The slurry of pellets and water is then usually passed through a dewatering device to remove most of the water. However, the pellets are still wet and have some excess water associated therewith and are normally then dried by movement through a centrifugal pellet dryer.

Centrifugal pellet dryers are well known and have been in use for a number of years. Known centrifugal pellet dryer structures are disclosed in prior U.S. Pat. Nos. 3,458,045, 4,218,323, 4,565,015 and 5,265,347, which are owned by the assignee of this application. Attention is invited particularly to the latter two patents for a disclosure of prior dryers over which the present invention is an improvement. Such prior pellet dryers include a screen enclosure or drum of generally cylindrical configuration in which is mounted a rotor including a driven rotatable shaft with lifter assemblies associated with the screen and mounted on the shaft by spiders in a manner to elevate pellets from a lower inlet to an upper outlet. The centrifugal forces imparted to the pellets as they rise in the dryer cause water to be discharged through the screen for drainage to any desirable discharge point. Air is circulated through the pellets as they are lifted to facilitate the drying operation. The dried pellets are then discharged from a discharge at the upper end of a housing normally provided for the dryer.

While previously known centrifugal pellet dryers have functioned satisfactorily, the present invention increases the effective operation by providing novel pellet lifter assemblies and novel spiders which have greater strength, are lighter weight and designed to facilitate assembly and replacement of components. Thus, the present invention provides a less complicated and lighter and better balanced rotor structure for drying plastic pellets.

SUMMARY OF THE INVENTION

An object of the present invention is to provide unique and novel supporting spiders and pellet lifter assemblies for a centrifugal pellet dryer. More specifically, it is the primary object of the present invention to provide a unique spider for supporting a plurality of unique pellet lifter assemblies from a vertically disposed driven shaft oriented concentrically within a peripheral foraminous screen.

Another object of the invention is to provide supporting spiders which are laser cut from a solid piece of metal to maintain desired strength characteristics with the spiders having a centrally disposed hub provided with a pair of peripherally spaced internally threaded bores receiving set screws for engaging flats formed at circumferentially spaced points on the driven shaft for securely locking the spiders in place on the shaft.

Still another object of the invention is to provide pellet lifter assemblies secured to the spiders by flanges formed on the spiders and carriage bolts securing mounting plates for the pellet lifting blades thereby enabling easy assembly and disassembly of the components of the pellet lifter assemblies.

A still further object of the invention is to provide pellet lifter assemblies including a plurality of partial arcuate lifting blades of flat inclined construction mounted by welding on the mounting plates with the upper end of each mounting plate including a horizontally disposed flange for displacing the pellets outwardly in relation to the screen for discharge at the upper end thereof.

Still further, it is another object of the present invention to provide a rotor structure for centrifugal pellet dryers which is easier and more economical to manufacture, repair and maintain compared with prior rotor constructions.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
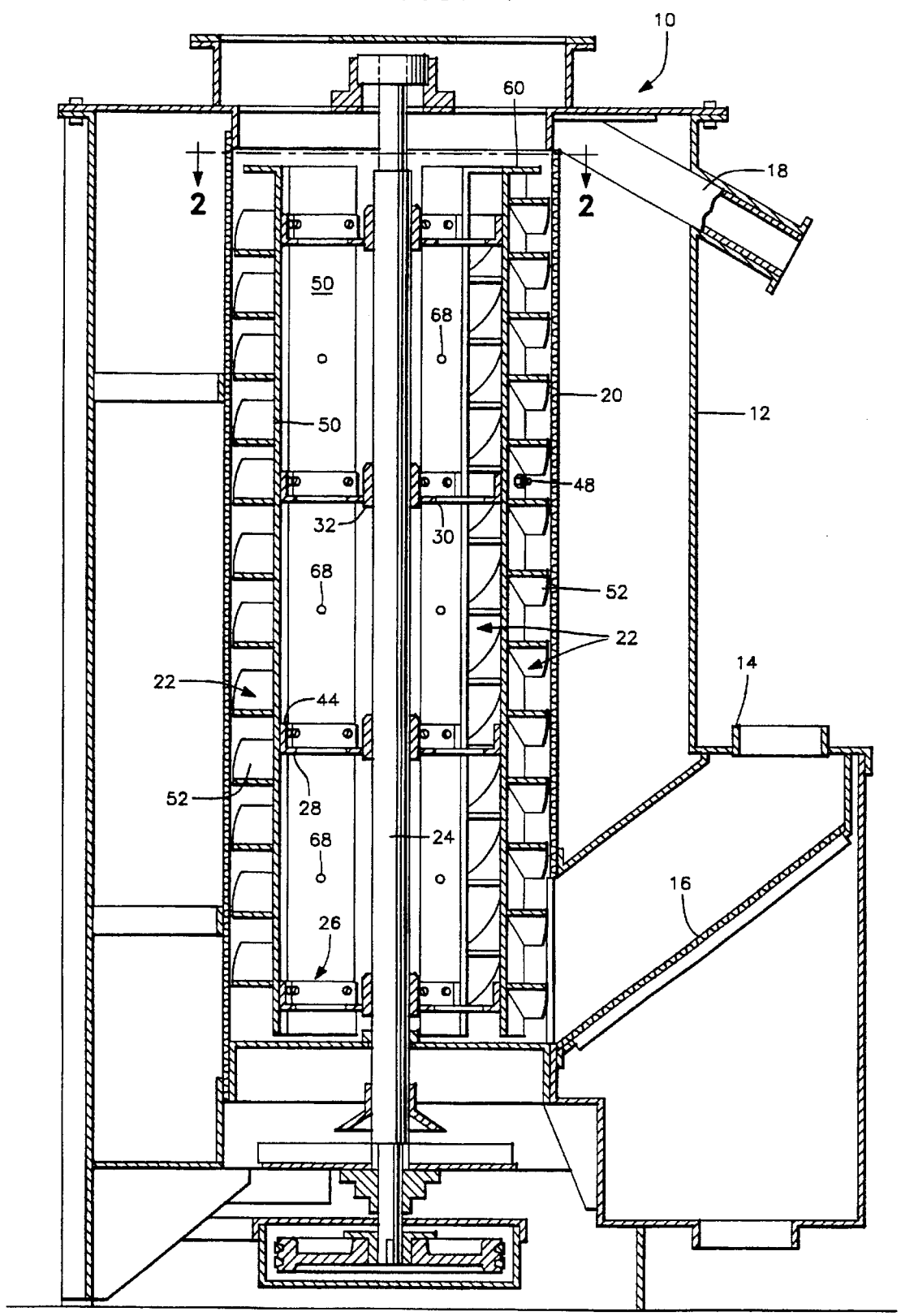
FIG. 1 is a vertical sectional view of a centrifugal pellet dryer illustrating the preferred spider and pellet lifter assemblies of the present invention incorporated therein.

In describing the preferred embodiment of the present invention as illustrated in the drawings, specific terminology will be resorted to for the sake of clarity. However, the invention is not intended to be limited to the specific embodiment and terms so selected, and it is to be understood that each specific term includes all technical equivalents which operate in a similar manner to accomplish a similar purpose.

FIG. 1 illustrates a centrifugal pellet dryer 10 in which the unique features of the present invention are incorporated. The dryer 10 includes a housing 12 provided with an inlet 14 adjacent the bottom for entry of the pellets to be dried. When fed into inlet 14, the pellets are deposited onto an inclined screen 16 which serves as a final dewatering device. The upper end of the housing 12 includes an outlet 18 for dried pellets and also as an air inlet for circulation of air through the dryer. Internally of the housing 12, the dryer 10 includes a cylindrical screen drum 20 into which the pellets are introduced at the bottom and they are lifted upwardly through the screen drum by the pellet lifter assemblies 22 which are mounted on a central driven shaft 24 by a plurality of vertically spaced support spiders 26.

Each spider 26 is made of a one piece plate 28 having apertures 30 formed therein which are laser cut to enable the rigidity of the plate to be retained. The center of the plate 28 is provided with a hub 32 for mounting the spider onto the shaft 24. The hub 32 is rigidly affixed to the plate 28 as by welding or the like and preferably includes a polygonal external surface 34 with a pair of internally threaded bores 36 being formed therein for receiving set screws 38. The set screws 38 preferably engage flats 40 on the shaft 24 to secure the spiders 26 rigidly and fixedly to the shaft 24.

Figure 3:
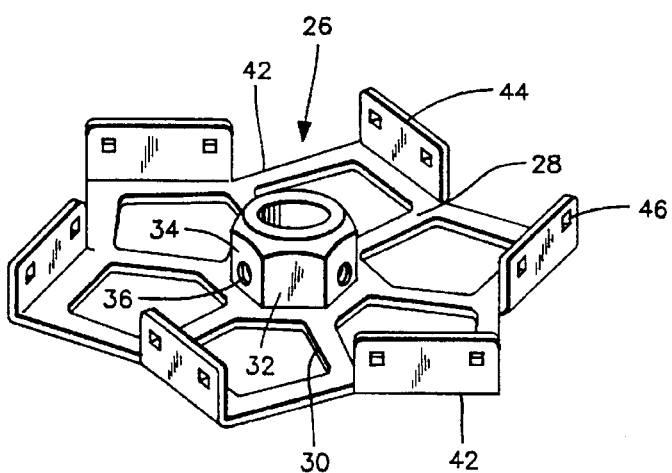
FIG. 3 is a perspective view of the preferred supporting spider for the pellet lifting assemblies in accordance with the present invention.

As illustrated in FIG. 3, the plate 28 includes a plurality of angled straight external edges 42 with alternate edges 42 including an upstanding flange 44 integral therewith. Each flange 44 includes a pair of spaced square apertures 46 for receiving carriage bolts 48 so that the carriage bolts, when inserted into the apertures 46 will not rotate. This arrangement of flanges 44 and free edges 42 between the flanges provides alignment of the bores 36 with the free edges 42 which do not have flanges thereon to enable a wrench or other tool easy access to the set screws 38 when locking the spiders 26 to the shaft 24. This also enables easy disassembly of the spiders in relation to the shaft when desired.

Figure 2:
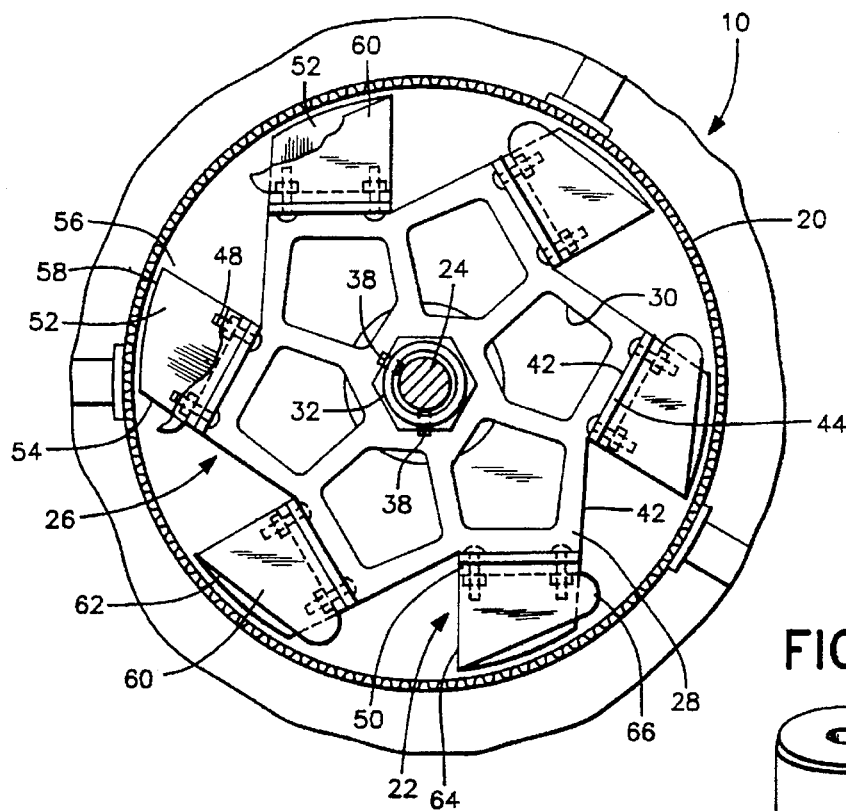
FIG. 2 is a transverse, sectional view taken substantially upon a plane passing along section line 2—2 on FIG. 1, with a portion cut away, to illustrate the structure of the preferred spider and its association with the lifter assemblies.
Figure 4:
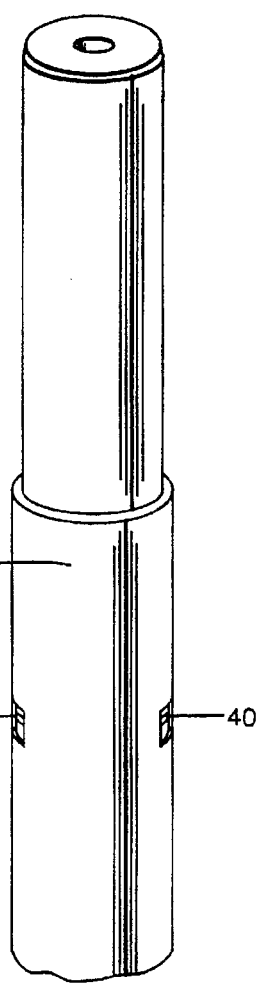
FIG. 4 is a perspective view of a portion of the rotor shaft.

The pellet lifter assemblies 22 are mounted on the flanges 44 with each assembly 22 including a vertically disposed mounting plate 50 of generally rectangular configuration having a width generally equal to the length of the flange 44 and secured thereto by the carriage bolts 48. The external surface of the mounting plate 50 is provided with a plurality of flat, inclined blades 52 affixed thereto by welding or the like in which the blades 52 have radially straight leading edges 54 and trailing edges 56. The inner edges of the plates are straight where they are secured to the mounting plates and the outer edges thereof are curved at 58 to generally conform with the internal surface of the screen drum 20 as illustrated in FIG. 2.

Mounted at the upper end of each of the mounting plates 50 is a horizontally disposed flat top flange 60. Top flange 60 is similar in configuration to the blades but includes a slanted straight outer edge 62, a straight trailing edge 64 and a rounded or curved leading edge 66. As shown, flanges 60 are preferably mounted rigidly on top of the mounting plates 50 as by welding or the like. The horizontal top flanges 60 cause the pellets being lifted by the blades 52 to move outwardly and around the outer edge of the flanges 60 as the pellets reach the top of the rotor structure adjacent the outlet 18.

During rotation of the shaft 24, the inclined blades 52 will engage and lift the pellets vertically upwardly and at the same time impart centrifugal force to the pellets and water so that the centrifugal force will cause the pellets and water to engage the screen. The water on the pellets will thus be discharged through the screen for drainage from the bottom of the pellet dryer. The structure of the rotor enables easy assembly of the spiders 26 on the shaft 24 and easy assembly of the pellet lifter assemblies 20 on the spiders 26. The spiders 26 are secured to the shaft 24 by the set screws 38 and the mounting plates 50 of the lifter assemblies are secured to the spiders 26 by the carriage bolts 48 extending through the apertures 46 in the flanges 44. After assembly, the shaft 24 with the lifter assemblies 20 thereon is dynamically balanced by rotation at a predetermined speed, and weights can be added as required to various of the mounting plates 50, such as by attaching such weights at apertures 68.

The structure of the spiders 26 and the lifter assemblies 20 enables the spiders to be easily mounted on the shaft and enables the lifter assemblies to be easily mounted on the spiders. By this arrangement, the components can be easily replaced when desired. This arrangement also permits the vertical dimension of the centrifugal pellet dryer to be varied with the number of spiders utilized determined by the length of the dryer. Thus, the components of the present invention can be easily assembled into centrifugal pellet dryers of any desired height without requiring significant changes in the components of the rotor structure.

The spider structure is laser cut from one piece of steel, giving it more strength as compared to prior structures composed of multiple pieces of flat bar and round bar which were welded together. The spider structure utilizes removable carriage bolts instead of welded in bolts. This enables the bolts to be replaceable, yet held securely in place, without the use of a tool, while the nuts are tightened. The hub structure strategically locates the set screws, making them more easily accessible between the lifter assemblies, which provides easier assembly and easier maintenance. The rotor structure minimizes catch points for any product passing through the dryer. The centrifugal force of the rotor allows the smooth surfaces of the spiders to free themselves of any product which might try to build up on them. The structure of the spider is also lighter and allows for better weight distribution, thus making balancing of the assembled rotor as easier task. The spider will also withstand more stress than previous spiders and displacement of the legs of this spider is less.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In a centrifugal pellet dryer having a generally cylindrical screen with a pellet inlet at the bottom and a pellet outlet at the top, a vertical shaft rotatable in the center of the screen, a plurality of circumferentially spaced pellet lifter assemblies oriented within the screen and a plurality of vertically spaced spiders supporting the pellet lifter assemblies from the shaft, each of said spiders comprising a spider plate of rigid construction and a hub generally at the center of and rigid with the plate and receiving the shaft, each of said spider plates including a peripheral edge and a plurality of circumferentially spaced flanges integral with said peripheral edge and extending substantially perpendicular thereto, each of said pellet lifter assemblies including a substantially vertically extending mounting plate, said flanges including anchoring structure removably mounting said pellet lifter assemblies to said spider plates, and a plurality of vertically spaced pellet lifting blades mounted rigidly on an outer surface of each vertically extending mounting plate, each lifting blade being inclined upwardly from a leading edge to a trailing edge for lifting particulate material upwardly in said cylindrical screen, said spider plate and flanges being of unitary construction.

2. The pellet dryer as defined in claim 1 wherein each of said hub is mounted centrally on the shaft and having at least a pair of radial threaded bores therein each receiving a set screw, said shaft including flats receiving the inner ends of the set screws for fixedly securing the spiders to the shaft.

3. The pellet dryer as defined in claim 2 wherein each of said spider plates includes a plurality of angularly disposed angled peripheral edges alternate of said integral flanges, said bores in the hub being aligned with the angled edges between said flanges to enable radial access between the vertically extending mounting plates to the set screws.

4. The pellet dryer as defined in claim 3 wherein each of said vertically extending mounting plates includes apertures therein, said anchoring structure including spaced square holes in each of said flanges, said vertically extending mounting plates being secured to the flanges by carriage bolts to enable assembly of the vertically extending mounting plates on the flanges on the spider plates, each lifting blade including an arcuate outer edge generally conforming with the interior of the screen, an upper end of each vertically extending mounting plate including an outwardly extending horizontal flange causing outward radial movement of the pellets as they move upwardly toward the upper end of the dryer into the outlet for the pellets.

5. The pellet dryer as defined in claim 4 wherein each of said spider plates is laser cut from a single piece of metal and includes large open areas inwardly of said flanges and said angled peripheral edges.

6. A spider for supporting particulate lifter assemblies from a rotatably driven shaft in a centrifugal pellet dryer, said spider comprising a one-piece plate of rigid metal construction and a hub rigidly mounted at the center of the plate receiving the shaft, said plate including a peripheral edge, a plurality of flanges on said peripheral edge and extending substantially perpendicular thereto, each of said flanges including anchoring structure for anchoring a lifter assembly thereto, said plate and flanges being of unitary construction.

7. A particulate lifter assembly for a centrifugal pellet dryer and supported from a rotatably driven shaft by a plurality of supporting spiders, said lifter assembly including a vertically extending mounting plate, a plurality of vertically spaced lifting blades mounted rigidly on an outer surface of the mounting plate, each lifting blade being flat and inclined upwardly from a leading edge to a trailing edge for lifting particulate material upwardly in a foraminous dryer drum.

8. The pellet dryer as defined in claim 1 wherein said peripheral edge of each spider plate includes a plurality of angulated edge portions of substantially equal length, said angulated edge portions defining diametrically opposed radial peaks and valleys, said flanges being unitary with alternate angulated edges, said leading edge of each of said blades being aligned with the angulated edge adjacent said flange from which the respective blades are supported, said leading edge of each blade being oriented in acute angular relation to a tangent of the interior of said cylindrical screen.

9. The pellet dryer as defined in claim 8 wherein each of said hubs includes a radial bore, a set screw received in said bore to secure the hub to said shaft, said bore being radially aligned with a central portion of an angulated edge portion in circumferentially spaced relation to said flanges and said vertically extending mounting plates to provide access to said set screw between said vertically extending mounting plates.

10. A centrifugal pellet dryer having a generally cylindrical screen with a pellet inlet at the bottom and a pellet outlet at the top, a vertical shaft rotatable generally in the center of the screen, a plurality of circumferentially spaced vertical pellet lifter assemblies oriented within the screen, and a plurality of vertically spaced spiders supporting the pellet lifter assemblies from the shaft, each of said spiders comprising a one-piece spider plate of rigid metal construction and a metal hub rigidly mounted generally at the center of the plate and receiving the shaft therethrough, each of said spider plates including a plurality of anchoring structures generally equally spaced circumferentially around the outer edge of said spider plates with open space therebetween, said anchoring structures removably mounting said vertical pellet lifter assemblies to said spider plates, said central hub having at least two radial threaded bores therein each receiving a set screw, said bores in the hub being aligned with at least two said open spaces between said circumferentially spaced anchoring structure to enable ready access to the set screws.

11. The pellet dryer as defined in claim 10 wherein each of said pellet lifter assemblies includes a generally vertical mounting plate, said anchoring structures mounting said mounting plate on said spider plates.

12. The pellet dryer as defined in claim 11 wherein each of said spider plates includes angled peripheral edge portions, alternate of said edge portions each having a generally vertically extending flange unitary with and generally perpendicular to said spider plate, said anchoring structure including fastener bolts securing the mounting plates to said flanges.

13. The pellet dryer as defined in claim 12 wherein said at least two bores and set screws are radially aligned with angled peripheral edge portions between said flanges and the mounting plates mounted thereon.

14. The pellet dryer as defined in claim 11 wherein each of said mounting plates includes a plurality of pellet lifting blades mounted in vertically spaced relation on an outer surface of each mounting plate, each blade having an outer edge disposed adjacent said screen for lifting pellets when the shaft is driven.

* * * * *